US010409490B2

(12) United States Patent
Scott et al.

(10) Patent No.: US 10,409,490 B2
(45) Date of Patent: *Sep. 10, 2019

(54) ASSISTING INPUT FROM A KEYBOARD

(71) Applicant: Microsoft Technology Licensing, LLC, Redmond, WA (US)

(72) Inventors: James Scott, Cambridge (GB);
Shahram Izadi, Cambridge (GB);
Nicolas Villar, Cambridge (GB); Ravin Balakrishnan, Toronto (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,317

(22) Filed: Feb. 27, 2017

(65) Prior Publication Data
US 2018/0018088 A1 Jan. 18, 2018

Related U.S. Application Data

(63) Continuation of application No. 12/714,314, filed on Feb. 26, 2010, now Pat. No. 9,665,278.

(51) Int. Cl.
*G06F 3/0489* (2013.01)
*G06F 3/02* (2006.01)
*G06F 17/27* (2006.01)

(52) U.S. Cl.
CPC .......... *G06F 3/04895* (2013.01); *G06F 3/021* (2013.01); *G06F 17/273* (2013.01); *G06F 17/276* (2013.01)

(58) Field of Classification Search
CPC .............................. G06F 3/04895; G06F 3/021
See application file for complete search history.

(56) References Cited

U.S. PATENT DOCUMENTS 5,909,667 A * 6/1999 Leontiades ............. G06F 3/167
704/235
7,378,991 B2 5/2008 Dietz et al.
(Continued)

OTHER PUBLICATIONS

"AlphaGrip, Comfortable, Hi-Speed Gaming & Computing", AlphaGrip Inc., Retrieved on Dec. 18, 2009 at «http://www.alphagrips.com/features.html», 1 pg.
(Continued)

*Primary Examiner* — Scott T Baderman
*Assistant Examiner* — Seung Woon Jung

(57) ABSTRACT

Assisting input from a keyboard is described. In an embodiment, a processor receives a plurality of key-presses from the keyboard comprising alphanumeric data for input to application software executed at the processor. The processor analyzes the plurality of key-presses to detect at least one predefined typing pattern, and, in response, controls a display device to display a representation of at least a portion of the keyboard in association with a user interface of the application software. In another embodiment, a computer device has a keyboard and at least one sensor arranged to monitor at least a subset of keys on the keyboard, and detect an object within a predefined distance of a selected key prior to activation of the selected key. The processor then controls the display device to display a representation of a portion of the keyboard comprising the selected key.

20 Claims, 9 Drawing Sheets

(56) References Cited

U.S. PATENT DOCUMENTS

| | | | | |
|---|---|---|---|---|
| 2005/0122313 | A1* | 6/2005 | Ashby | G06F 3/0219 345/168 |
| 2006/0188855 | A1* | 8/2006 | Okada | G07F 17/32 434/227 |
| 2008/0145127 | A1 | 6/2008 | Liu | |
| 2008/0201438 | A1* | 8/2008 | Mandre | H04L 51/04 709/206 |
| 2008/0218950 | A1 | 9/2008 | Morrison | |
| 2008/0246731 | A1 | 10/2008 | Chechelniker | |
| 2008/0303793 | A1 | 12/2008 | Carroll | |
| 2009/0089666 | A1* | 4/2009 | White | G06F 3/0237 715/257 |
| 2009/0158191 | A1* | 6/2009 | Varanda | G06F 3/0481 715/773 |
| 2010/0113073 | A1* | 5/2010 | Schlesener | H04W 4/02 455/466 |
| 2010/0164756 | A1* | 7/2010 | Vanninen | G06F 3/0202 341/22 |
| 2010/0177035 | A1* | 7/2010 | Schowengerdt | G06F 1/163 345/156 |
| 2012/0062465 | A1* | 3/2012 | Spetalnick | G06F 3/0236 345/168 |
| 2013/0298059 | A1* | 11/2013 | Raskin | G06F 3/0484 715/767 |

OTHER PUBLICATIONS

"BackTyping: What is it Good for?", Grippity Inc., Retrieved on Dec. 18, 2009 at «http://www.grippity.com/products.html», pp. 1-2.

Baudisch, et al., "Back-of-Device Interaction Allows Creating Very Small Touch Devices", ACM 2006, In the Proceedings of the 27th International Conference on Human Factors in Computing Systems, Session: New Mobile Interactions, 2009, 1923-1932.

Clawson, et al., "The Impacts of Limited Visual Feedback on Mobile Text Entry for the Twiddler and Mini-Qwerty Keyboards", IEEE Computer Society, In the Proceedings of the Ninth IEEE International Symposium on Wearable Computers, 2005, pp. 170-177.

Conrad, et al., "Standard Typewriter Versus Chord Keyboard—An Experimental Comparison", Taylor & Francis Group, Ergonomics, 1965, vol. 8, Issue 1, pp. 77-88.

"DataHand Ergonomic Keyboards: Feel the Difference", DataHand Systems Inc., Retrieved on Dec. 18, 2009 at «http://www.datahand.com/» pp. 1-2.

Green, et al., "A Reduced Qwerty Keyboard for Mobile Text Entry", ACM, In the CHI '04 Conference—Extended Abstracts on Human Factors in Computing Systems, Session: Late Breaking Result Papers, 2004, pp. 1429-1432.

Himberg, et al., "On-Line Personalization of a Touch Screen Based Keyboard", ACM, In the Proceedings of the 8th International Conference on Intelligent User Interfaces, Session: Full Technical Papers, 2003, pp. 77-84.

Hinckley, et al., "Touch-Sensing Input Devices", ACM, In the Proceedings of the SIGCHI Conference on Human Factors in Computing Systems: the CHI is the Limit, 1999, pp. 223-230.

Hirche, et al., "Adaptive Interface for Text Input on Large-Scale Interactive Surfaces", In the Third IEEE International Workshop on Tabletops and Interactive Surfaces, 2008, pp. 153-156.

Lyons, et al., "Twiddler Typing: One-Handed Chording Text Entry for Mobile Phones", 2004, Available at «http://www.cc.gatech.edu/ccg/publications/twiddler-chi04.pdf», In the Proceedings of CHI '04, ACM, Apr. 2004, Vienna, Austria, 8 pgs.

MacKenzie, "KSPC (Keystrokes per Character) as a Characteristic of Text Entry Techniques", Springer-Verlag, In the Proceedings of the 4th International Symposium on Mobile Human-Computer Interaction, Lecture Notes in Computer Science, vol. 2411, pp. 195-210.

MacKenzie, et al., "Text Entry for Mobile Computing: Models and Methods, Theory and Practice", Taylor & Francis Group, Human-Computer Interaction, Sep. 2002, vol. 17, Issue 2 & 3, pp. 147-198.

Matias, et al., "Half-Qwerty: A One-Handed Keyboard Facilitating Skill Transfer From Qwerty", ACM, IN the Proceedings of the Interact '93 and CHI '93 Conference on Human Factors in Computing Systems, 1993, pp. 38-94.

"Noahpad UMPC (4)—Back Typing Keyboard with Strap", You Tube LLC, Retrieved on Dec. 18, 2009 at «http://www.youtube.com/watch?v=1ygLi33rp9A», pp. 1-2.

Rekimoto, et al., "PreSense: Interaction Techniques for Finger Sensing Input Devices", UIST '03, Vancouver, BC, Canada.

"SafeType Ergonomic Keyboard", Retrieved on Dec. 18, 2009 at «http://safetype.com/» pp. 1-3.

Sellen, et al., "The Prevention of Mode Errors Through Sensory Feedback", L. Erlbaum Associates Inc., Human-Computer Interaction, 1992, vol. 7, Issue 2, pp. 141-164.

Silfverberg,. "Using Mobile Keypads with Limited Visual Feedback: Implications to Handheld and Wearable Devices", In the Proceedings of Mobile HCL 2003, Springer-Verlag, 2003, pp. 76-90.

Sugimoto, et al., "HybridTouch: an Intuitive Manipulation Technique for PDAs Using Their Front and Rear Surfaces", ACM, In the Proceedings of the 8th Conference on Human-Computer Interaction with Mobile Devices and Services, Session: Novel Interaction Solutions, 2006, pp. 137-140.

Vogel, et al., "Hand Occlusion with Tablet-Sized Direct Pen Input", ACM, In the Proceedings of the 27th International Conference on Human Factors in Computing Systems, Session: Non-Traditional Interaction Techniques, 2009, pp. 557-566.

Wigdor, et al., "LucidTouch: A See-Through Mobile Device", ACM, In the Proceedings of the 20th Annual ACM Symposium on User Interface Software and Technology, Session: Novel Displays and Interaction, 2007, pp. 269-278.

Wobbrock, et al., "An Alternative to Push, Press, and Tap-tap-tap: Gesturing on an Isometric Joystick for Mobile Phone Text Entry", ACM, In the Proceedings of the SIGCHI Conference on Human Factors in Computing Systems, Session: Mobile Interaction Techniques, 2007, pp. 667-676.

Wobbrock, et al., "The Performance of Hand Postures in Front- and Back-of-Device Interaction for Mobile Computing", Academic Press Inc., International Journal of Human-Computer Studies, 2008, vol. 66, Issue 12, pp. 857-875.

Rekimoto et al., PreSense: "Interaction Techniques for Finger Sensing Input Devices", 2003, ACM, UIST '03, p. 203-207.

* cited by examiner

ASSISTING INPUT FROM A KEYBOARD

CROSS-REFERENCE TO RELATED APPLICATIONS

This application is a continuation of U.S. application Ser. No. 12/714,314, filed Feb. 26, 2010, the entirety of which is hereby incorporated by reference herein.

BACKGROUND

Typing using a keyboard has remained as the most common way of inputting alphanumeric data into a computer. The keyboard can be characterized as an indirect interaction device, as the user interacts with a separate device (the keyboard) and the result of the interaction (the text input) is displayed on-screen spatially offset from the keyboard. Even when software keyboards are used with touch-sensitive screens, the input is still indirect to some extent as the fingers are pressing keys that are offset from a text input location (i.e. cursor) on the screen. If a software keyboard is displayed sufficiently close to the text input location to be considered as direct interaction, then the keyboard consequently obscures a significant portion of the user interface.

The indirect nature of keyboard input means that users can often struggle to learn to enter alphanumeric data in an efficient manner. This is often because the users are not sufficiently familiar with the keyboard layout, which results in the users looking at the keyboard rather than the text being entered on the screen. This is exacerbated by the proliferation of new types of devices having keyboards, in both hardware and software forms. This includes, for example, tablets, smartphones and netbooks. Each of type of device has its own design constraints, which results in keyboard layout differences.

Often, as a result of unfamiliarity with the keyboard layout, users make repeated mistakes when entering text using a keyboard, and as a result a muscle memory develops. Such a muscle memory can be hard to subsequently break.

The embodiments described below are not limited to implementations which solve any or all of the disadvantages of known keyboard data entry techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Assisting input from a keyboard is described. In an embodiment, a processor receives a plurality of key-presses from the keyboard comprising alphanumeric data for input to application software executed at the processor. The processor analyzes the plurality of key-presses to detect at least one predefined typing pattern, and, in response, controls a display device to display a representation of at least a portion of the keyboard in association with a user interface of the application software. In another embodiment, a computer device has a keyboard and at least one sensor arranged to monitor at least a subset of keys on the keyboard, and detect an object within a predefined distance of a selected key prior to activation of the selected key. The processor then controls the display device to display a representation of a portion of the keyboard comprising the selected key.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a desktop computing system, the system described is provided as an example and not a limitation. As those skilled in the art will appreciate, the present examples are suitable for application in a variety of different types of systems using keyboard input.

Figure 1:
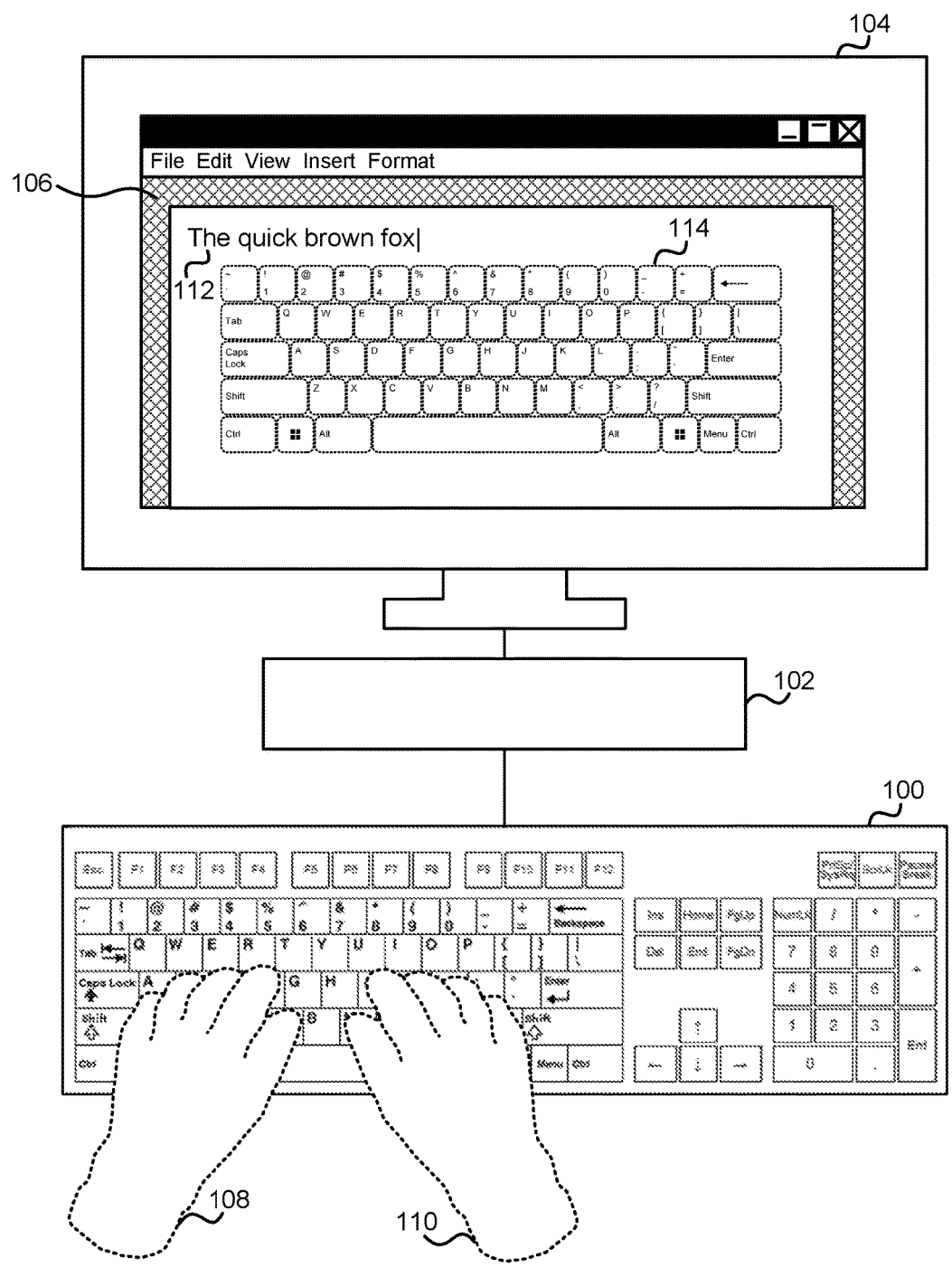
FIG. 1 illustrates a computing device with an on-screen keyboard representation.

Reference is first made to FIG. 1, which illustrates a computing device comprising a keyboard 100, a processing unit 102, and a display device 104. Although the computing device shown in FIG. 1 is shown having separate elements (as in a desktop computing device), the elements can also be integrated into a single unit (as in a laptop/notebook computing device, tablet or smartphone). The keyboard shown in FIG. 1 has a traditional QWERTY layout, but in other examples any type of keyboard layout can be used. Examples of alternative layouts include AZERTY, QWERTZ or Dvorak. In addition, the keyboard can be of a device-specific layout, for example a keyboard mounted on the rear of a tablet device arranged to be used whilst holding the device.

The processing unit 102 comprises a processor and can optionally further comprise storage devices and interfaces, as outlined in more detail with reference to FIG. 9 below. The processing unit 102 is arranged to receive input from the keyboard, execute instructions (in the form of software) and provide output to the display device 104. In this example, the processing unit 102 is executing an operating system (OS) and application software. In this example, the application software is a word-processing application, but any application using keyboard input can also be used.

The display device 104 can be in the form of a screen arranged to display a graphical user interface to a user of the computing device. In this example, the display device 104 is displaying a user interface 106 of the application software executed on the processing unit 102.

In use, a user of the computing device can enter alphanumeric data into the keyboard 100 by typing with first hand 108 and second hand 110. The keyboard 100 provides key-activation data corresponding to keys pressed by the user to the processing unit 102. The processing unit 102 processes the key-activation data and, in the case that the data corresponds to alphanumeric information intended to be entered into the application software, controls the display device 104 to display the key presses as characters 112 in the user interface 106.

If the user does not know the layout of the keyboard 100, then, in order to type accurately, the user looks at the keyboard 100 and their hands 108, 110, rather than at the user interface 106. This interrupts the typing process, and slows it down. To address this, the processing unit 102 is arranged to control the display device 104 to display a representation 114 (or visualization) of the keyboard layout. The representation 114 is overlaid on the user interface 106, and positioned in proximity to the characters 112. The user is then able to view the keyboard layout without looking at the keyboard 100. This enables the user to become familiar with the keyboard layout, thereby increasing the user's typing speed and accuracy.

However, the overlaying of the representation 114 obscures a portion of the user interface 106. This can result in the user being unable to see additional text or controls without either scrolling through the text, or moving the representation 114 in the display. This can be alleviated by the processing unit rendering the representation 114 as partially transparent and/or by automatically rearranging the elements of the user interface 106 and the representation 114 so that the representation 114 only obscures areas of the user interface 106 which are not the current focus of the user's attention or input.

Figure 2:
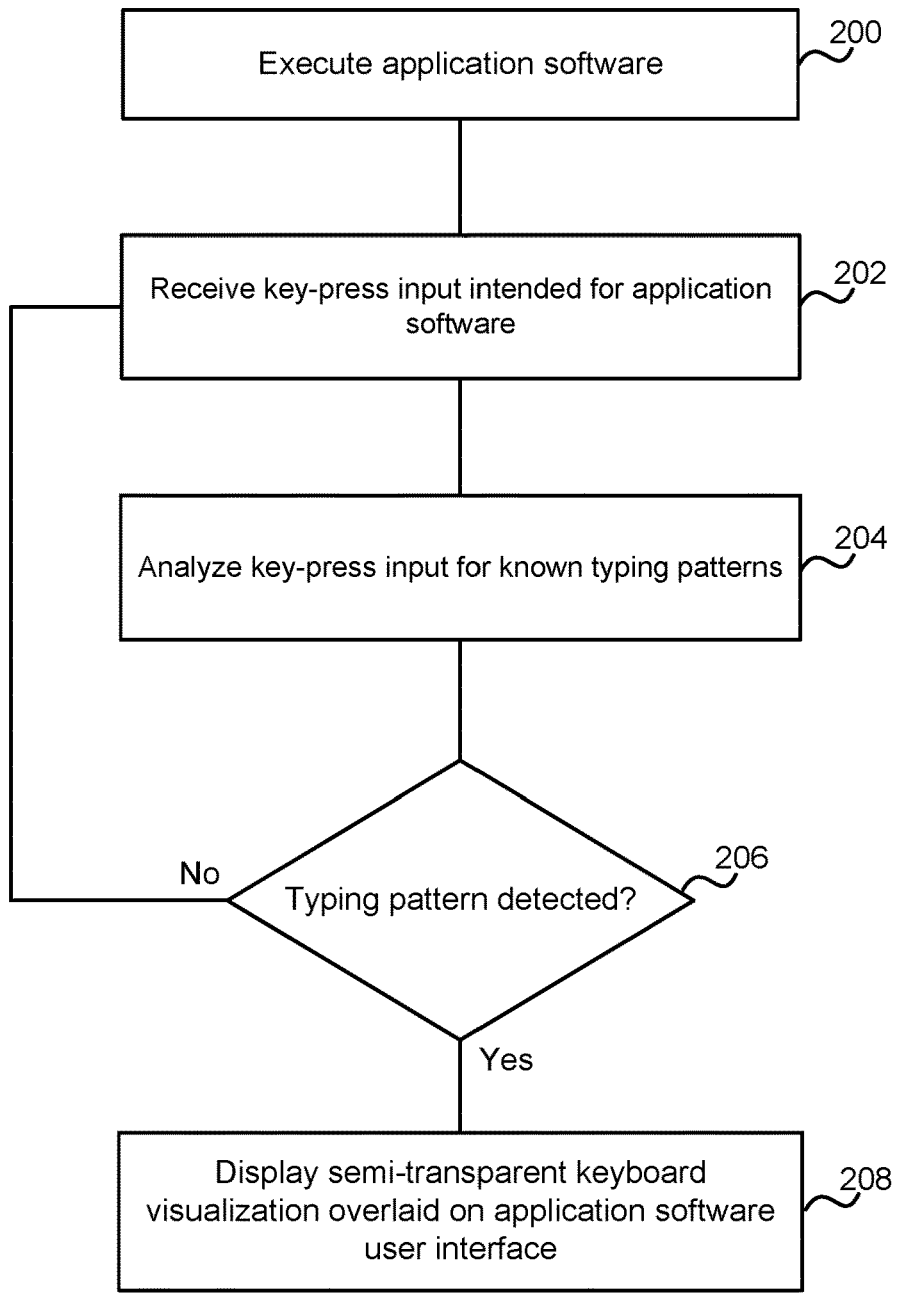
FIG. 2 illustrates a flowchart of a process for displaying a keyboard representation.

More experienced users who are familiar with the keyboard layout may not want the representation 114 to be present, and FIG. 2 illustrates a flowchart of a process for automatically determining whether to display the representation 114, based upon the typing behavior of the user.

The flowchart of FIG. 2 illustrates a process performed by the processing unit 102. The processing unit 102 executes 200 the application software (e.g. word processing software as shown in FIG. 1), and receives 202 key-press input comprising alphanumeric data intended for the application software. The key-press input results from the user typing using the keyboard 100 (i.e. the user activating a plurality of keys). The processing unit 102 then analyzes 204 the key-press input to identify predefined typing patterns. The processing unit 102 can search for one or more known typing patterns in the key-press input, examples of which are outlined in more detail hereinafter.

If it is determined 206 that one or more of the predefined typing patterns have been detected, then the processing unit 102 controls the display device 104 to display 208 the representation 114 of the keyboard to the user, overlaid on the application software user interface 106. In other examples, the processing unit 102 can additionally control the display of the representation 114 in order to reduce the amount of user interface 106 obscured by the representation 114, as described hereinafter.

If it is determined 206 that one or more of the predefined typing patterns have not been detected, then the processing unit 102 returns to receiving key-press input without displaying the representation 114, and the process is repeated until a typing pattern is detected. Note that whilst the process shown in FIG. 2 is executed, the key-press input from the keyboard is also passed to the application if appropriate, so that the characters 112 are shown in the user interface 106 and are unaffected by the FIG. 2 process. Note that control keys can also be part of the key-press input, but are not directly shown in the application but instead have other effects on the user interface or application software.

As mentioned above, the processing unit 102 analyzes 204 the key-press input to identify predefined typing patterns. Some example typing patterns that the processing unit 102 can detect are now outlined. In one example, the processing unit 102 can detect whether the key-presses comprise a plurality of key-presses of a predefined key within a time threshold. In other words, if the predefined key is pressed more than once within a certain time interval, then the display of the representation 114 is triggered. This can be used to detect, for example, repeated pressing of the backspace key (or delete key) within a time interval. Repeated pressing of the backspace key in a short time-frame can indicate that the user is making many mistakes when typing.

Pressing and holding a predefined key can be interpreted in a similar manner, as the key-repeat function of the keyboard treats this in a similar way to repeated key presses. In some examples, the time interval can be sufficiently short that only successive presses of the predefined key (without intermediate key-presses) triggers the display of the representation.

In another example, the processing unit 102 can detect whether the key-presses comprise a key-press of a first predefined key immediately following one or more key-presses of further predefined keys. In other words, certain combinations of key-presses can trigger the display of the representation 114. For example, the processing unit 102 can store a list of common typing mistakes made by users (e.g. typing 'tje' instead of 'the'), compare the list to the key-presses and detect when the key-presses match an entry in the list. In addition, this type of typing pattern can also be provided by the application software itself (e.g. as provided by Microsoft® Word's 'autocorrect' feature). In such examples, an interface to the application software is provided to enable the application software (rather than dedicated typing analysis algorithms) to indicate that the user would benefit from visualization assistance with their typing at that time.

Alternatively (or additionally) the processing unit can track the user's typing behavior and learn the key combinations that indicate errors being made. For example, the processing unit 102 can record when a certain combination of letters are typed, then deleted and replaced with a different combination (or the same letters in a different order). The deleted combination can be stored and used to trigger the display of the representation 114.

In another example, the processing unit 102 can determine from the key-presses a rate of input of key-presses and detect whether this input rate is less than a threshold value. Therefore, the processing unit 102 uses the key-presses to estimate a typing speed. If the typing speed is too low, then this can indicate that the user is struggling to type, and hence the display of the representation is triggered.

In another example, the processing unit 102 can determine whether the key-presses comprise one or more words that are not present in a stored dictionary. In other words, the key-presses are compared to a dictionary, such as that used by a spell-checker, to determine whether typing mistakes are being made. Spell-checkers are widely used by word-processing and office software, and contain comprehensive dictionaries. These can therefore be used as a reliable determination of whether the user's typing is accurate.

In another example, the predefined typing pattern can be an indicator of the user's typing style, and the triggering of the display of the representation 114 can be based on an estimation of this typing style. For example, an analysis can be made as to whether the user is touch-typing, or whether the user is a 'hunt and peck' typist (or somewhere between these extremes). To achieve this, the processing unit can record and analyze time-delays between key-presses and use this information with knowledge of the keyboard layout to detect whether a user of the keyboard is not touch-typing. If the user is not touch-typing, then the representation 114 can be displayed.

The relative timing between key-presses can be used to estimate how many fingers the user is using to type. For example, for a touch-typist using all fingers there is only a short time delay between pressing the 'f' key and pressing the 'a' key (as an example only) as these keys are activated by different fingers. Conversely, for a single-finger typist, these keys are pressed by the same finger, and hence there is a relatively long time delay between the key-presses. The processing unit 102 can track one or more such key combinations and the time delays between them to ascertain the typing style of the user, and display the representation 114 accordingly.

Alternatively (or in addition to) using the time-delays between certain key combinations, the processing unit 102 can also determine whether the user is touch-typing by using one or more sensors to detect the position of the user's digits (i.e. fingers and thumbs) over the keyboard. Example sensors are discussed in more detail with reference to FIGS. 3 to 5 below. By using sensors to track the position of the user's digits, the processing unit 102 can determine whether the user rests their digits on the 'home keys', and types from that position (indicating touch typing), or whether the user tends to move only a subset of their digits over the keys to type. As above, the representation 114 can be displayed to non-touch-typists to assist them with learning a more efficient typing style.

Furthermore, this technique can be used to improve the typing abilities of users that can touch-type, but do not do so in the most efficient or correct manner. For example, the processing unit 102 can use the sensors to detect that user is using the wrong finger to press a given key, and consequently use the representation to indicate the correct finger to the user. Therefore, even if the user is typing reasonably fast and accurately, this improves the user's technique even further by encouraging the user to learn to touch-type correctly.

Note that any of the above-described techniques for detecting a typing pattern and triggering the display of the representation 114 can be used either alone or in combination.

As mentioned above with reference to FIG. 2, the processing unit 102 is arranged to display 208 the representation 114 on the display device 104. The display of the representation 114 can be controlled in several ways, as outlined below, to enhance the usability of the computing device.

Firstly, in one example, the degree of transparency of the representation 114 can be dynamically controlled. For example, the degree of transparency of the representation 114 can be dependent on the elapsed time since the most recent typing pattern (as described above) was detected (i.e. dependent on the frequency of typing errors). In other words, when the predefined typing pattern is detected, the representation 114 is displayed with a first level of transparency, and as time elapses without further predefined typing patterns being detected the transparency of the representation 114 is increased until it has completely disappeared from the display. If further predefined typing patterns are detected, however, the transparency of the representation 114 can be reduced to make it more visible to the user.

For example, the transparency of the representation can be controlled such that after one of the predefined typing patterns are detected the degree of transparency of the representation 114 is increased by a fixed amount (e.g. after every detected typing mistake the representation 114 becomes 5% less transparent). Alternatively, the transparency of the representation can be controlled such that after one of the predefined typing patterns are detected the representation 114 is reset to a fixed degree of transparency (e.g. after every detected typing mistake the representation 114 changes to 50% transparent).

The transparency of the representation can be arranged to increase linearly over time whilst the predefined typing patterns are not detected. Alternatively, the transparency of the representation can be arranged to increase in discrete steps each time a specified interval has elapsed.

Dynamically controlling the transparency of the representation 114 reduces the extent to which the representation obscures the user interface 106 for user's that do not benefit from typing assistance (ultimately removing it altogether from the display), whilst ensuring that it is made more prominent for user's that do require assistance. In addition, the changing transparency provides the user with encouragement in the form of a goal (making the representation completely transparent), thereby encouraging them to avoid making mistakes and hence developing good typing habits.

In addition to controlling the transparency of the representation 114, the processing unit 102 can also (or alternatively) control the display of the representation such that only a portion of the keyboard is displayed. For example, the amount of the keyboard shown in the representation can be made dependent on the elapsed time between detecting the predefined typing patterns (i.e. the frequency of typing errors). If the elapsed time between detecting the predefined typing patterns is less than a threshold, then the whole of the keyboard can be represented, as this indicates that the user would benefit from assistance. If the elapsed time is greater than this threshold, then only a portion of the keyboard can be displayed. By only displaying a representation of a portion of the keyboard, the user interface 106 is obscured less for users that do not require as much typing assistance.

The representation of a portion of the keyboard displayed can be centered on the area of the keyboard at which a typing error occurred. For example, when the processing unit 102 detects that the backspace key is being used, the representation can be controlled to only comprise those keys being deleted, and the immediately surrounding keys (or a fixed size region surrounding these keys). Furthermore, if the processing unit 102 knows of alternative 'correct' typing patterns, e.g. through the use of a dictionary, then it can additionally highlight keys in the representation that the user intended to type.

In addition, the amount of the keyboard shown in the representation can be controlled in dependence on the elapsed time between detecting the predefined typing patterns. For example, if only infrequent errors are made, then only a small area of the keyboard is represented (e.g. only the key pressed in error and its surrounding keys). If more frequent errors are made, then successively larger portions of the keyboard can be displayed in the representation (e.g. two levels of surrounding keys, or the half of the keyboard in which the error was made).

In another example, the overall size of the representation 114 can be dynamically controlled. As with the control of the transparency, the size of the representation 114 can be controlled in dependence on the elapsed time since the most recent typing pattern was detected (i.e. dependent on the frequency of typing errors). In other words, when the predefined typing pattern is detected, the representation 114 is displayed with a first size, and as time elapses without further predefined typing patterns being detected the size of the representation 114 reduces until it has completely disappeared from the display. If further predefined typing patterns are detected, however, the size of the representation 114 can be increased to make it more visible to the user.

The representation can be arranged to shrink linearly over time whilst the predefined typing patterns are not detected. Each time the predefined typing pattern is detected the representation can either revert to a fixed size or increase in size by set amount.

In other examples, the location at which the representation is displayed on the display device can be dynamically controlled in dependence on the frequency of detection of the predefined typing patterns. For example, if the predefined typing patterns are detected frequently (i.e. the user is making lots of typing errors) then the representation can be moved closer to the text entry location (i.e. the cursor). Conversely, if the predefined typing patterns are detected less frequently (i.e. the user is making fewer typing errors) then the representation can be moved further away from the text entry location, so that the user interface is less obscured.

In a further example, the information displayed within the representation can be controlled in dependence on the detected typing patterns. For example, the key-press input from the user can be monitored to determine whether the user is utilizing shortcut keys to control the application software (e.g. 'ctrl'+'c' to copy; 'ctrl'+'a' to select all, etc). If it is detected that shortcuts are not being used, then the representation can be changed to display the function of the shortcut when an appropriate key is pressed. For example, when the 'ctrl' key is pressed, the representation can be changed to show the word 'copy' on the 'c' key, etc.

Furthermore, the shortcut keys can be actively promoted to the users using the representation. For example, if the processing unit 102 detects that the user is using a pointing device to perform an action (such as copy, paste etc), then it can display the representation and highlight the appropriate key combination to achieve the same action (e.g. 'ctrl'+'c'; 'ctrl'+'v', etc). In this way, the users are educated on the available shortcut keys for the actions that they perform.

Note that any of the above-described techniques for controlling the display of the representation 114 can be used either alone or in combination.

In some examples, the process of FIG. 2 and the above-described techniques for triggering and displaying the representation can be performed by a background process or software daemon, which can be incorporated into the operating system or can be a separately-installed application for the purpose of assisting typing and executed on the processing unit 102. By performing this process at the operating system, it enables the representation to be displayed for any application software executed at the processing unit 102. In other examples, the application software can integrate the analysis techniques and visualizations, so that users using that application software are aided without relying on the presence of separately installed software. As mentioned above, these techniques can be applied for any type of keyboard layout on any suitable device. This includes both hardware keyboards using physical switch devices, and also software keyboards where the keyboard is displayed on a touch sensitive display screen.

Reference is now made to FIGS. 3 to 8, which illustrate the use of key sensors to further enhance the use of the representation in assisting keyboard input. In these examples, the sensors are arranged to detect when a digit of the user is within a predetermined distance (i.e. greater than or equal to zero) of a key. In other words, the sensors are arranged to detect either when a digit of the user is in close proximity to (but not yet in contact with) a key (i.e. 'hovering'), or touching a key of the keyboard but not yet pressing the key sufficiently to activate it (i.e. not applying sufficient pressure for key activation).

The sensors are arranged to provide the processing unit 102 with information on where the user's digits are over (or on) the keyboard and utilize this in the representation before a key is pressed. This enables the representation to be enhanced to show what the user is about to do, in advance of a key-press. This can therefore prevent the user from performing an erroneous action on the keyboard, which avoids a muscle-memory developing for an incorrect movement.

In one example, the sensors can be arranged to monitor all the keys on the keyboard, to provide a full picture of how the user is interacting with the keyboard. In alternative examples, the sensors can cover only a subset of the keys. For example, to determine whether or not a user is touch-typing, only a subset of the keys can be monitored (e.g. the home keys). Alternatively, sensors can be used that are not precise enough to determine which exact key each digit of the user is on, but are sufficiently precise to determine, for example, whether the user is touch typing or not.

Figure 3:
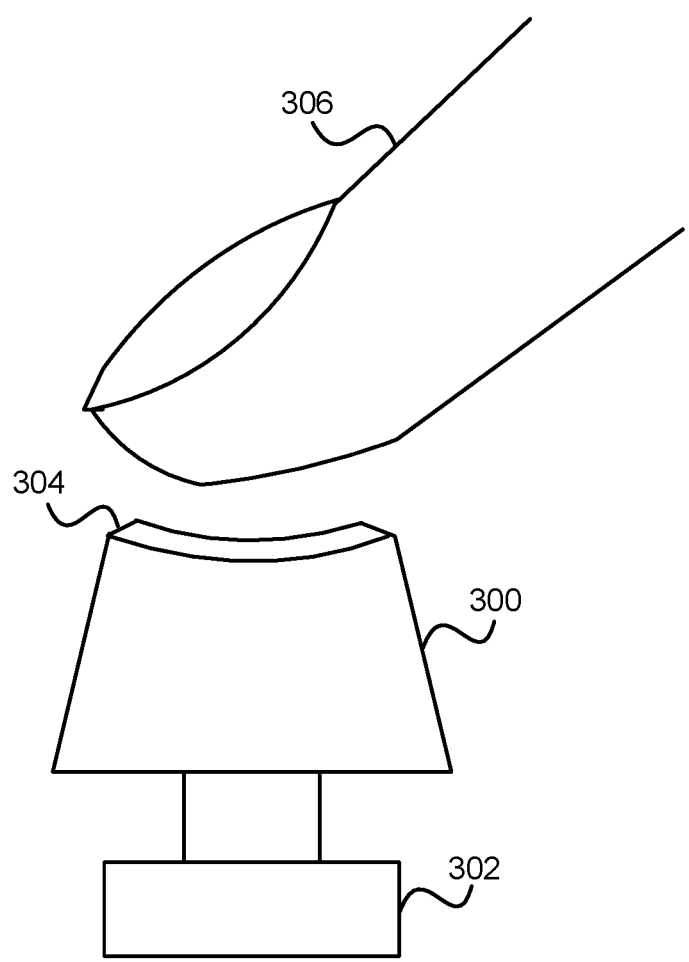
FIG. 3 illustrates a capacitive key sensor.
Figure 4:
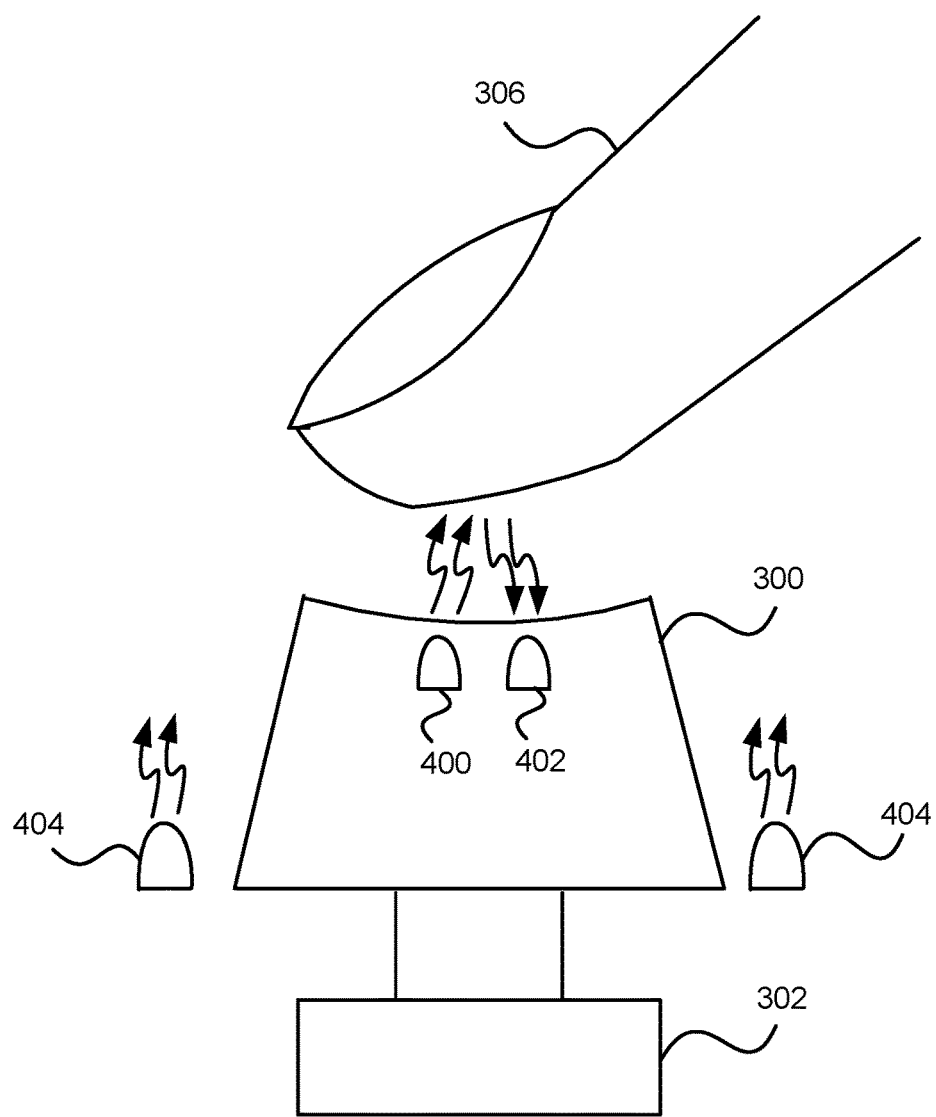
FIG. 4 illustrates an infra-red key sensor.
Figure 5:
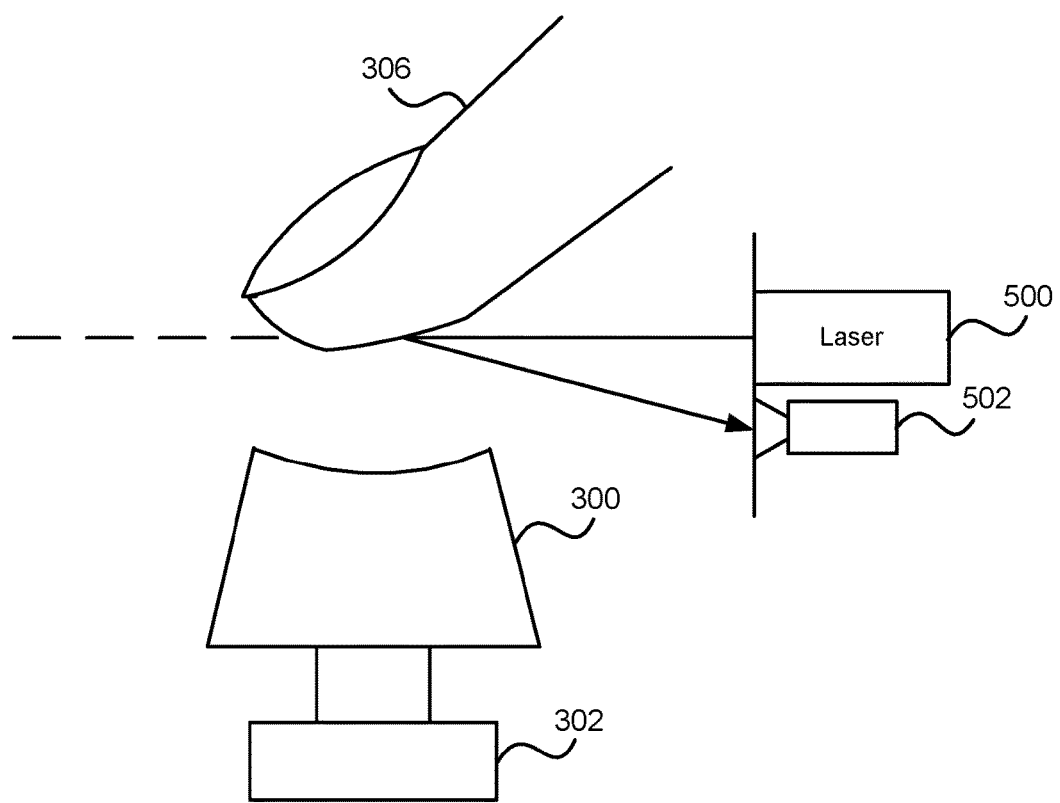
FIG. 5 illustrates a laser key sensor.

FIGS. 3 to 5 show example sensor arrangements. FIG. 3 illustrates a capacitive key sensing arrangement. A key-cap 300 is mounted on a switch device 302 in accordance with a traditional keyboard. Mounted on the top surface of the key-cap 300 is a capacitive sensor 304. When a digit 306 of the user is brought into contact with the capacitive sensor 304, a change in capacitance is detected, and the presence of the user's digit 306 in contact with the key can be ascertained. The detection of the user's digit 306 using a capacitive sensor 304 can be performed without the user applying significant pressure to the key-cap 300, and hence the digit 306 can be detected without activating the key. In addition, the capacitive sensor 304 can also be used to detect when the digit 306 is in proximity to, but not touching, the key by increasing the amplification of the signals from the capacitive sensor. In an alternative arrangement to that shown in FIG. 3, the capacitive sensor can be located below the key rather than on the key cap, if a sufficiently sensitive sensor is used. By applying the sensor shown in FIG. 3 to at least a subset of the keys of a keyboard, the user's digits can be tracked, and the information used as described below.

FIG. 4 illustrates an infra-red (IR) key sensing arrangement. In a first example, the key-cap 300 comprises one or more (IR) emitters 400 and one or more IR detectors 402. The IR detectors 402 are connected to a circuit (or software module) arranged to trigger a signal when the incident IR light on the detector is greater than a threshold. As the user's digit 306 is brought closer to the key-cap 300, an increasing amount of IR light is reflected from the emitters 400 by the digit 306. When the digit is sufficiently close to the key-cap 300 the IR light incident on the detectors 402 is sufficient to trigger the signal, and indicate the presence of the user's digit above the key. The threshold can be altered such that the user's digit is only detected when it is just in contact with the key-cap 300, or when it is hovering above the key-cap 300.

In another example, the emitters 400 from within the key-cap 300 can omitted, and emitters 404 mounted between the keys can be used instead. This can reduce the number of emitters used and the complexity of the key-cap. In a further example, the emitters can be omitted completely, and passive IR detection can be used from the radiated heat of the user's digit. In an alternative arrangement to that shown in FIG. 4, the key caps can be transparent to IR light, and the sensors located beneath the keys. By applying the sensors shown in FIG. 4 to at least a subset of the keys of a keyboard, the user's digits can be tracked, and the information used as described below.

FIG. 5 illustrates a laser key sensing arrangement. A laser 500 is arranged to generate a sheet of light over the surface of the keyboard (i.e. above the key-cap 300). A lens can be used to generate such a sheet from a laser emitter. An IR laser can be used, as this is not visible to the human eye. A camera (e.g. an IR camera) is mounted relative to the laser 500 so that reflected radiation can be detected by the camera. For example, as shown in FIG. 5, the camera is mounted close to the laser 500, so that when the sheet is interrupted by the digit 306 of the user, the reflected radiation is visible to the camera 502.

Image data from the camera is passed to image processing software (which can be executed on the processing unit 102, or on a dedicated processor), which uses the intensity of the reflected radiation to estimate the distance between the camera and the digit causing the reflection. This information can be combined with information on the keyboard layout to determine which key the user's digit 306 is above.

The sensing arrangement of FIG. 5 does not require a separate sensor for each key, but instead uses a single sensor to cover the whole keyboard. Furthermore, the sensing arrangement of FIG. 5 can be readily applied to software keyboards, as no modification to the internal structure of the keyboard is used.

In an alternative arrangement, the camera 502 of FIG. 5 can be utilized without the laser 500. For example, the camera 502 can be arranged to operate in a 'shadow' mode in which there is background light (either ambient or provided by an emitter) and the digits of the user obscure this light, such the image at the camera is a negative. This image can be analyzed using image processing software to estimate the location of the digits of the user. In a further alternative, the laser 500 can be replaced with less directional emitter, so that more of the digits are illuminated. The camera 502 then operates in 'reflective' mode, and the image of the illuminated digits is analyzed using image processing software to estimate their location. The 'shadow' and 'reflective' mode examples can utilize either IR or visible light cameras. In a further alternative, the camera 502 can be a depth-camera. In the above examples, the camera 502 can be arranged to view the keys from across their surface, or from the top. In addition, the camera can either integrally mounted on the keyboard, or separate.

A further sensing arrangement (not shown in the figures) can utilize additional switches for each key, which detect the application of light pressure on the key-cap, such as is seen when the user rests a digit on a key, but is not applying enough pressure to activate the key. This enables detection of when a user is lightly touching a key.

Figure 6:
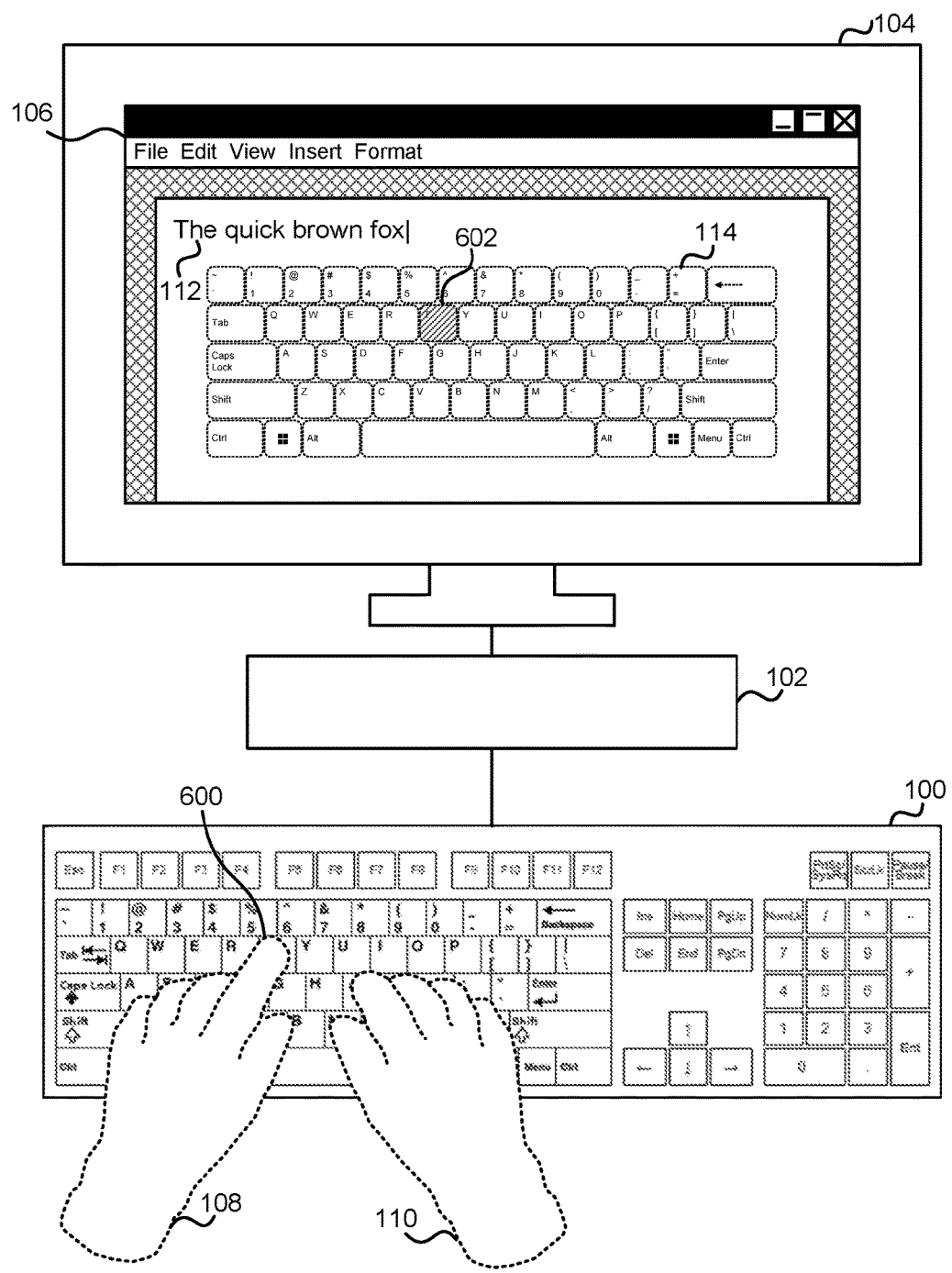
FIG. 6 illustrates highlighting of a key in the representation prior to a key-press.
Figure 7:
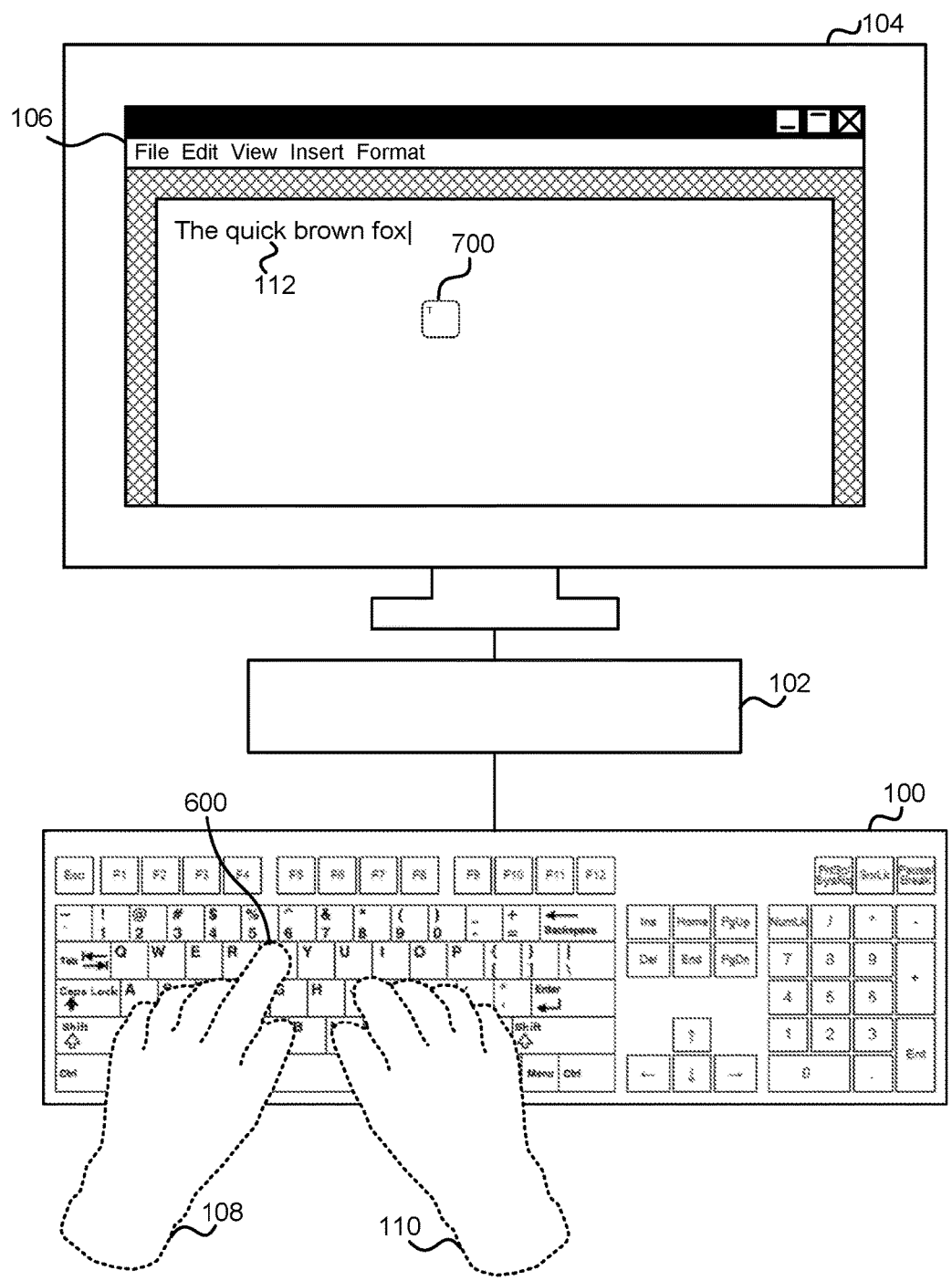
FIG. 7 illustrates highlighting of a key without a full representation prior to a key-press.
Figure 8:
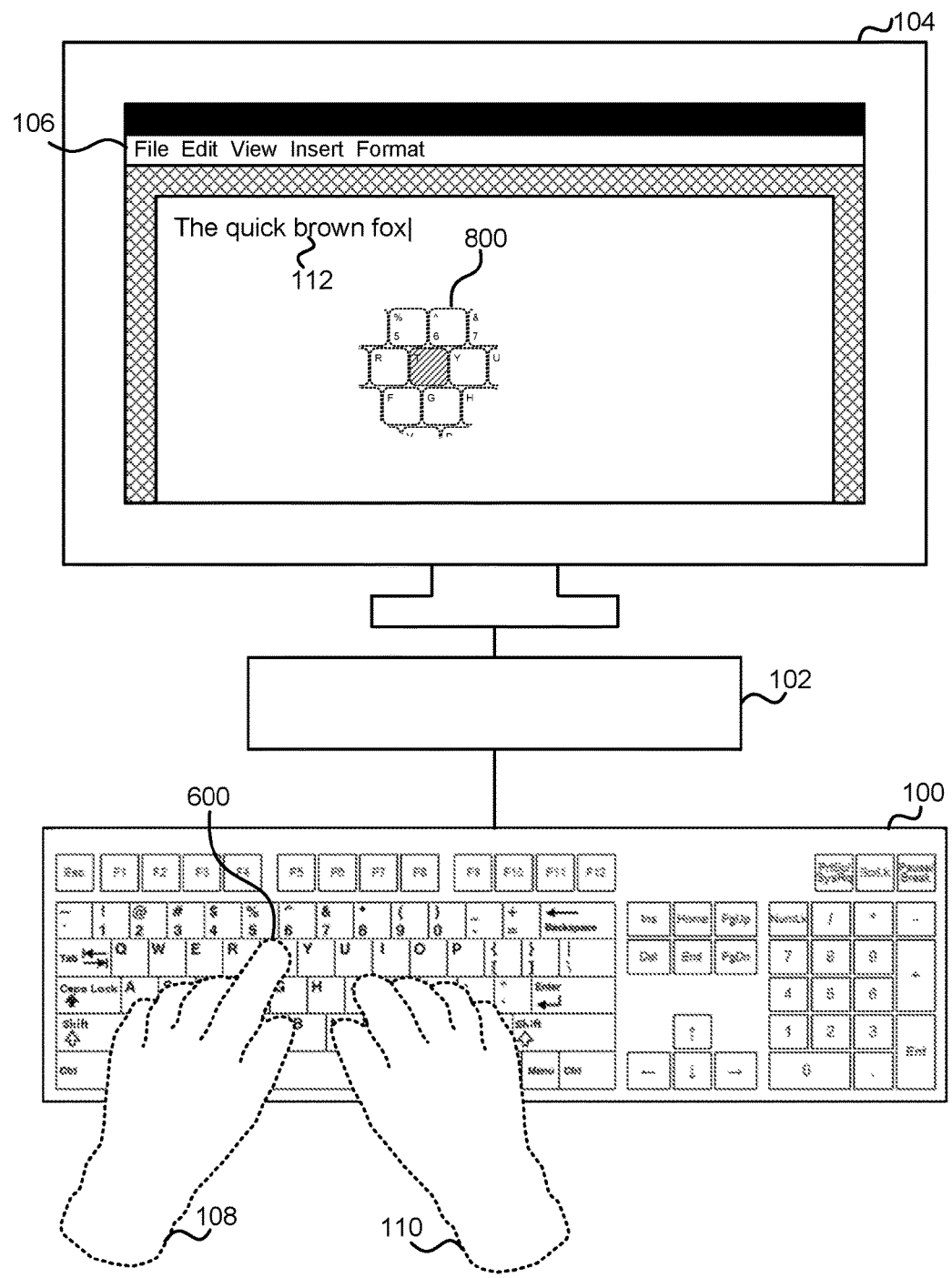
FIG. 8 illustrates highlighting of a key with a portion of the representation prior to a key-press.

FIGS. 6 to 8 illustrate examples of how the key-sensing data can be used to enhance the representation of the keyboard. As mentioned, the sensors provide data to the processing unit 102 that enable the processing unit 102 to determine which keys are being touched or have a digit in proximity (depending on the sensing type). FIG. 6 illustrates a first example of how this data can be used to enhance the representation 114 by highlighting a key in the representation prior to a key-press. In the example of FIG. 6, the user is moving digit 600 such that it is hovering above (or touching) the 'T' key on the keyboard 100. However, the user has not yet activated the 'T' key. The processing unit 102 has used the sensor data to detect the digit 600 in proximity to the 'T' key, and is controlling the display of the representation 114 to visually highlight the 'T' key 602 in the representation. Therefore, the user is able to see which key they are about to press in the representation 114, before actually activating the key. This enables the user to stop a movement before making a mistake, and may prevent an incorrect muscle memory from developing.

The processing unit 102 can be arranged to highlight all keys in the representation 114 that the sensors have determined have digits in proximity. Alternatively, as shown in FIG. 6, only a key that has recently detected a digit can be highlighted. In other words, the processing unit 102 attempts to highlight only those keys to which a user is currently moving their digits. Once a digit has been stationary on a key for a predetermined period of time, the processing unit 102 removes the highlighting for that key from the representation. This prevents the user being distracted by highlighted keys that are not currently being used, or are being touch by other parts of the user's hand.

FIG. 7 illustrates a further example of the use of key sensor data. In this example, the sensor data is used to control the display such that only the keys that have digits in proximity to them are displayed. In FIG. 7, the user's digit 600 is again touching (or hovering over) the 'T' key, and the display device 104 displays a representation of the 'T' key 700, but not a representation of the wider keyboard. This therefore still provides the user with information on the key they are about to press, and prevents mistakes, but obscures very little of the user interface 106. As with FIG. 6, the processing unit 102 can show all keys that have digits in proximity, or only those for which movement is detected (i.e. recent touching/hovering).

FIG. 8 illustrates a further example between the two extremes of FIGS. 6 and 7. In this example, the sensor data is used to control the display such that the keys that have digits in proximity to them are displayed, along with a region surrounding those keys. In FIG. 8, the user's digit 600 is again touching (or hovering over) the 'T' key, and the display device 104 displays a partial representation 800 of the keyboard showing a predefined radius centered on the 'T' key. In this example, the 'T' key within the partial representation 800 is highlighted. This provides the user with information on the key they are about to press, and prevents mistakes, and obscures less of the user interface 106 than a full representation of the keyboard. In addition, it still aids a user that is unfamiliar with the keyboard layout, as they are able to see the surrounding keys.

The users are also able to 'search' for a key by drawing a digit over the keyboard, such that the partial representation reveals the keys in the region under the user's digit, in the manner of a flashlight revealing a portion of a darkened room. As above, the processing unit 102 can show all keys that have digits in proximity, or only those for which movement is detected (i.e. recent touching/hovering).

The processing unit 102 can further utilize the sensor data by tracking the detected digits and generating a model of the user's hands on the keyboard. From the sensor data and the keyboard layout, the processing unit 102 can estimate which digits are in proximity to which keys, and use this to render a representation of the user's hands. The representation of the user's hands can be displayed on the representation 114 of the keyboard, to further help the user in visualizing how they are typing whilst looking at the display. In addition, the processing unit 102 can also generate a second set of hands showing a preferred typing position for each key pressed by the user (i.e. showing where the hands ought to be placed and what digit ought to be used to activate a given key). This can be overlaid on the representation 114 of the keyboard in addition to the representation of the user's hands, so the user can compare their own hand positions to the preferred hand positions.

Figure 9:
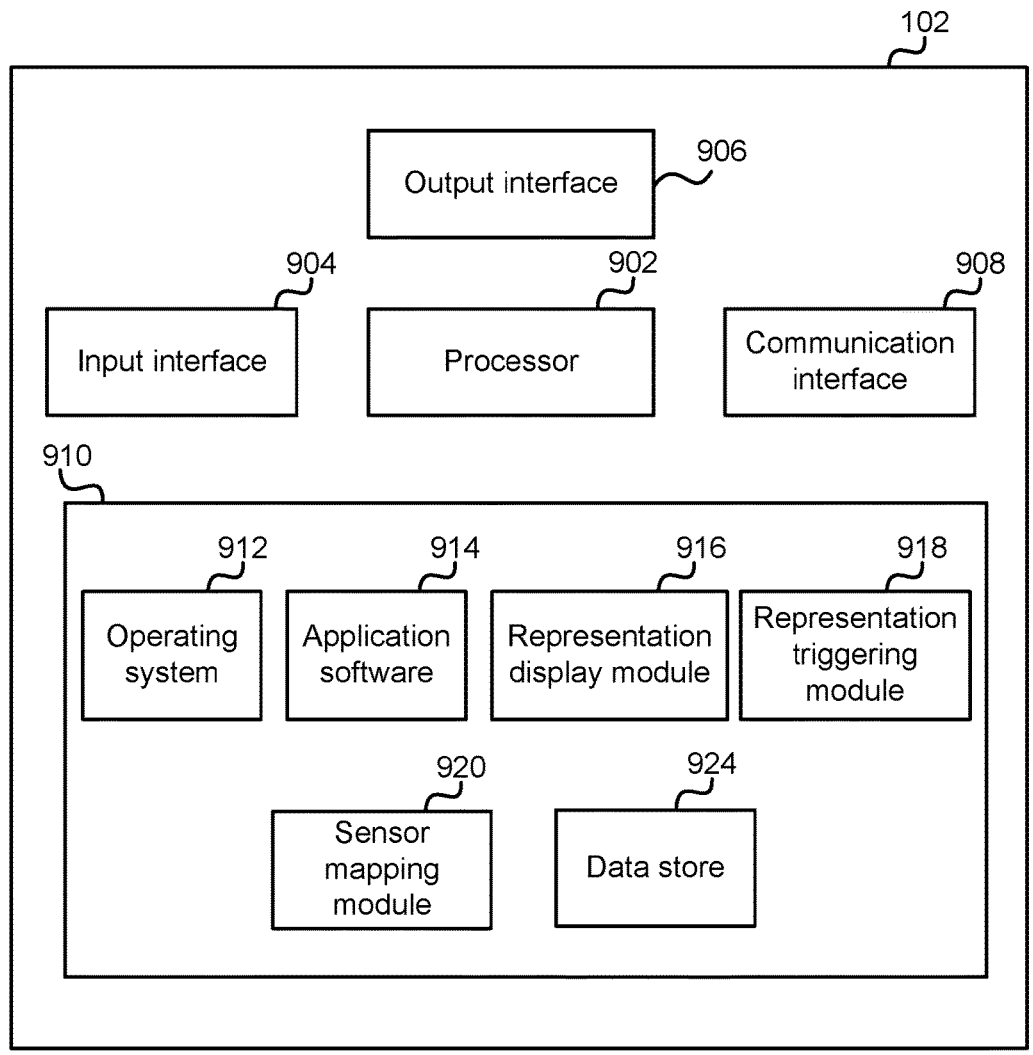
FIG. 9 illustrates an exemplary computing-based device in which embodiments of the keyboard assist technique can be implemented.

FIG. 9 illustrates various components of an exemplary computing-based device, such as processing unit 102, which can be implemented as any form of a computing and/or electronic device, and in which embodiments of the keyboard typing assistance technique can be implemented.

The processing unit 102 comprises one or more processors 902 which can be microprocessors, controllers or any other suitable type of processors for processing computing executable instructions to control the operation of the device in order to act upon inputs from a keyboard and/or sensors and display the representation accordingly.

The processing unit 102 comprises one or more input interfaces 904 which are of any suitable type for receiving data from user input devices such as keyboard 100, key sensors and/or a pointing device. An output interface 906 is arranged to output display information to display device 104 which can be separate from or integral to the processing unit 102. The display information provides the graphical user interface 106. Optionally, a communication interface 908 can be provided for data communication with one or more networks, such as the internet.

Platform software comprising operating system 912 or any other suitable platform software can be provided at the computing-based device to enable application software 914 to be executed on the processing unit 102. Other software functions can comprise one or more of:

A representation display module 916 arranged to control the display device 104 to display the keyboard representation overlaid on the user interface (with varying degrees of transparency, extent, size and location);

A representation triggering module 918 arranged to determine whether to display the representation based on the user typing behavior;

A sensor mapping module 920 arranged to determine whether a digit of the user is in proximity to a key on the keyboard;

A data store 921 arranged to store keyboard layouts, typing patterns, dictionaries, etc.

The computer executable instructions can be provided using any computer-readable media, such as memory 910. The memory is of any suitable type such as random access memory (RAM), a disk storage device of any type such as a magnetic or optical storage device, a hard disk drive, or a CD, DVD or other disc drive. Flash memory, EPROM or EEPROM can also be used. Although the memory is shown within the processing unit 102 it will be appreciated that the storage can be distributed or located remotely and accessed via a network or other communication link (e.g. using communication interface 908).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method for assisting input from a keyboard, comprising:
receiving, at a processor, a plurality of key-presses from the keyboard comprising alphanumeric data for input to application software executed at the processor, a plurality of characters represented on the keyboard remaining the same during each of the plurality of key-presses;
analyzing the plurality of key-presses at the processor to detect an entry in a list of common typing errors including the plurality of key-presses, wherein analyzing the plurality of key-presses comprises detecting whether the plurality of key-presses comprises a word a user is having trouble typing; and
responsive to detecting the entry in the list of common typing errors, controlling a display device to display a representation of at least a portion of the keyboard in association with a user interface of the application software, the representation of at least a portion of the keyboard being displayed in proximity to a part of the display device where the entry in the list of common typing errors is displayed separate from the keyboard, the proximity of the representation of at least the portion of the keyboard to the part of the display device where the entry in the list of common typing errors is displayed being at least partly dependent on the entry in the list of common typing errors including the plurality of key presses.

2. A method according to claim 1, wherein the list of common typing errors comprises a list of words with which a user commonly has typing errors.

3. A method according to claim 2, wherein controlling the display device to display a representation of at least a portion of the keyboard comprises entering an interface based on the entry in the list of common typing errors to indicate that the user would benefit from visualization assistance.

4. A method according to claim 3, wherein a plurality of highlighted keys comprise the representation of at least a portion of the keyboard being displayed to reinforce correct key locations or the word the user is having trouble typing.

5. A method according to claim 4, wherein controlling the display device to display a representation of at least a portion of the keyboard comprises obscuring one or more keys.

6. A method according to claim 1, wherein the step of analyzing the plurality of key-presses comprises analyzing time delays between the key-presses and detecting whether a user of the keyboard is not touch-typing correctly.

7. A method according to claim 1, wherein the representation is partially transparent and is overlaid on the user interface of the application software.

8. A method according to claim 7, further comprising the step of changing the transparency of the keys corresponding to the word.

9. A method according to claim 1, further comprising the step of receiving, at the processor, sensor data from at least one sensor arranged to monitor at least a subset of keys on the keyboard to detect one or more digits of a user within a predefined distance thereof.

10. A method according to claim 9, further comprising the step of: analyzing the sensor data to determine the position of the digits of the user and detect whether the user is not touch-typing; and responsive to detecting that the user is not touch-typing, controlling the display device to display the representation of at least a portion of the keyboard in association with the user interface of the application software.

11. A method according to claim 9, further comprising the steps of: analyzing the sensor data to determine the position of the digits of the user; generating a model of the user's hand from the position of the digits of the user; and displaying the model in combination with the representation on the display device.

12. A method according to claim 11, further comprising the steps of: generating a further model of a hand indicating a preferred typing position, and displaying the further model in combination with the model of the user's hand and the representation on the display device.

13. A method according to claim 1, wherein the keyboard is one of: a hardware keyboard comprising a plurality of hardware key switches; or a software keyboard displayed on the display device, and wherein the display device comprises a touch sensitive screen.

14. A computer device, comprising:
a processor;
a display device;
a keyboard comprising a plurality of keys and arranged to provide key activation data to the processor; and
at least one sensor arranged to monitor at least a subset of the keys to detect selection of a first key and at least one other key by a user and provide detection data to the processor indicating detection of the selection of the first key,
wherein the processor is arranged to control the display device to display a first representation of a portion of the keyboard comprising at least the selected first key and at least one other key responsive to receiving the detection data, the at least one other key comprising a second representation of at least a portion of the keyboard being based at least in part on an entry in a list of common typing errors corresponding to a word a user is having trouble typing and displayed on the display device, the entry in the list of common typing errors being displayed separate from the first representation of a portion of the keyboard, the proximity of the first representation of at least the portion of the keyboard to the part of the display device where the entry of the list of common typing errors is displayed being at least partly dependent on the entry in the list of common typing errors including the first key and the at least one other key.

15. A device according to claim 14, wherein the first representation of the portion of the keyboard comprises a highlighted representation of the first key.

16. A device according to claim 15, wherein the first representation of the portion of the keyboard comprises a highlighted representation of the at least one other key, the surrounding keys within a predefined radius thereof being obscured.

17. A device according to claim 14, wherein the keyboard is one of: a hardware keyboard comprising a plurality of hardware key switches; or a software keyboard displayed on the display device, and wherein the display device comprises a touch sensitive screen.

18. A device according to claim 14, wherein the at least one sensor is arranged to monitor at least a subset of the keys to detect a digit of the user of the keyboard.

19. A device according to claim 14, wherein the at least one sensor comprises at least one of:
   a capacitive sensor mounted on each of the keys;
   an infra-red detector mounted on each of the keys; and
   a laser arranged to emit a laser sheet over the keys and a camera arranged to detect reflections caused by an object interrupting the laser sheet.

20. A computer device, comprising:
   a processor;
   a display device; and
   a keyboard comprising a plurality of keys and arranged to provide key-press data to the processor, wherein each of the keys comprises a sensor arranged to detect a user's digit selecting a respective key and provide data to the processor indicating detection of the user's digit prior to activation of the respective key, a plurality of characters represented respectively on the plurality of keys remaining the same during provision of the key-press data,
   wherein the processor is arranged to receive a plurality of key-presses from the keyboard comprising alphanumeric data for input to application software executed at the processor, analyze the plurality of key-presses to detect entry in a list of common typing errors including the plurality of key-presses including analyzing the plurality of key-presses to detect whether the plurality of key-presses comprises a word a user is having trouble typing, and, responsive thereto, control the display device to display a representation of at least a portion of the keyboard overlaid on a user interface of the application software on the display device, at least some of the keys of the representation of at least a portion of the keyboard highlighted.

\* \* \* \* \*